Figure 1:
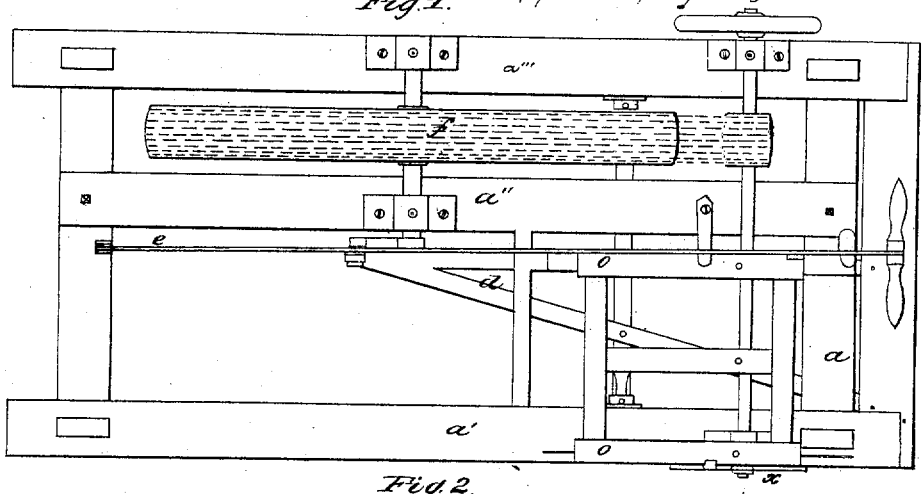
Figure 2:
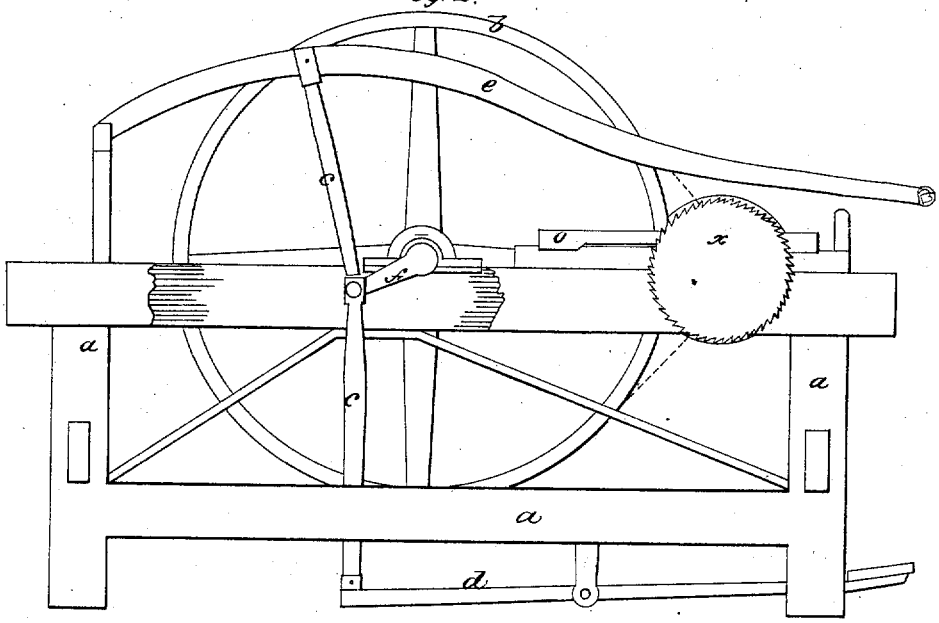

I. E. Overpeck,
Converting Motion.

No. 2,350. Reissued Sep. 4, 1866.

Witnesses
H. P. K. Peck
Arthur L. Peck

Inventor
Isaac E. Overpeck

AM. PHOTO-LITHO. CO. N.Y. (OSBORNE'S PROCESS)

UNITED STATES PATENT OFFICE.

ISAAC E. OVERPECK, OF OVERPECK'S STATION, OHIO.

IMPROVEMENT IN MANUAL-POWER MACHINES.

Specification forming part of Letters Patent No. 47,447, dated April 25, 1865; Reissue No. 2,350, dated September 4, 1866.

*To all whom it may concern:*

Be it known that I, ISAAC E. OVERPECK, of Overpeck's Station, in the county of Butler and State of Ohio, have invented certain new and useful Improvements in Manual-Power Machines; and I do hereby declare that the following is a full, clear, and exact description of the same, reference being had to the accompanying drawings, and to the letters of reference marked thereon.

The nature of my invention consists in the combination of two levers with the crank-shaft of the principal driving-wheel, so as to be operated both by the hands and feet of one or more attendants simultaneously to and from each other, as will be hereinafter described.

The object is to produce a manual-power machine which can be used successfully in place of any of the single-horse-power machines now in use.

In the annexed drawings, *a a a* denote the main frame of the machine, the top portion of which consists of the three string-beams *a′ a″ a‴*, the latter two of which support in suitable boxes the journals of the main balance and driving wheel *b*, and the central string-beam, *a″*, is strongly braced to prevent it from vibrating, which would cause the main wheel *b* to swing laterally in its revolutions.

*c c* are the connecting-rods which communicate motion from the treadle-lever *d* and hand-lever *e* to the crank *f* of the main-wheel shaft.

A saw-shaft is placed in suitable boxes across the main frame and provided with a pulley, to be driven by a band from the main wheel. This shaft is also provided with a saw, *x*, at one end and with a balance-wheel at the other, as represented in the accompanying drawings.

In this machine a suitable carriage, O, is provided, which supports the wood while being fed thereon to the saw.

It will be observed that the lever of the first order, to which a treadle is attached, has for its fulcrum a rock-shaft journaled in suitable pendants firmly secured to the bottom-side frame-pieces, as seen in the drawings, and that the hand-lever, which is of the second order, has its fulcrum at the extreme end, which is hinged to a projecting shaft or upright firmly fastened to the frame. When the wrist-pin of the crank-shaft is brought to a point in its circuit coinciding with a vertical line drawn through the center of the crank-shaft, it will be observed that the two connecting-rods *c c* are standing at an angle of ten (10) degrees (more or less) with said vertical line. This relative arrangement of the connecting-rods with their respective levers and their common crank may be varied to any necessary degree to attain the intended purpose—namely, to avoid a dead-point in operating the driving mechanism. The same result could readily be accomplished by the use of two crank-arms on the main shaft; but such an arrangement would fall short of attaining the ultimate and especial object of my invention, as I will more fully explain.

I have found by practice with a machine of this kind that in order to avail of the muscular or manual power of the operator to the best advantage, and so as to afford the greatest economy of labor and ease to the operator, that the levers *d* and *e* must move toward each simultaneously, and vice versa, and therefore the connecting-rods should be jointed to a common crank. This will appear obvious when it is considered that the effort of the attendant to throw or push the hand-lever upward will cause a corresponding power and action to be given to the treadle-lever, upon which the weight of the operator's body will then be resting; and when the movement of the lever is reversed the weight of the operator is mostly thrown upon the hand-lever, while one of his feet is resting upon the ground.

It will now be fully understood that the manner described of arranging the connecting-rods at an angle to the vertical line drawn through the center of the crank-shaft does not merely obviate a dead-point in the revolution of the main driving-wheel, but permits the arrangement and organization of the other parts of the machine through which the power is transmitted, whereby compensating alternate rest or ease is allowed to the different muscles of the operator, and this, too, is greatly augmented by the fact that one-half of the power applied in propelling the machine is given by the gravity of the operator's body while his muscular power is essentially at rest.

The experiments which I have made in developing and maturing my said invention have fully demonstrated its superior advantages in practical use, and, as I believe, is capable of increasing the results of manual labor fourfold for the purposes for which it is intended and designed.

Having thus fully described my invention, what I claim as new, and desire to secure by Letters Patent, is—

The two levers *d* and *e*, moving simultaneously toward and from each other, when arranged to operate upon a center-wheel, *b*, or its equivalent, substantially in the manner and for the purpose herein specified.

As evidence that I claim the foregoing I have hereunto set my hand in the presence of witnesses.

ISAAC E. OVERPECK.

Witnesses:

T. B. WARWICK,

ISRAEL WILLIAMS.